(12) United States Patent
Pozarnsky

(10) Patent No.: US 6,689,190 B2
(45) Date of Patent: *Feb. 10, 2004

(54) PROCESS FOR THE MANUFACTURE OF REACTED NANOPARTICLES

(75) Inventor: Gary A. Pozarnsky, St. Paul, MN (US)

(73) Assignee: Cima Nanotech, Inc., Woodbury, MN (US)

(*) Notice: Subject to any disclaimer, the term of this patent is extended or adjusted under 35 U.S.C. 154(b) by 32 days.

This patent is subject to a terminal disclaimer.

(21) Appl. No.: 10/026,487

(22) Filed: Dec. 20, 2001

(65) Prior Publication Data

US 2003/0116228 A1 Jun. 26, 2003

(51) Int. Cl.$^7$ .................................................. B22F 9/12
(52) U.S. Cl. .......................................... 75/332; 75/367
(58) Field of Search ........................ 75/332, 336, 343, 75/355, 360, 367

(56) References Cited

U.S. PATENT DOCUMENTS

| | | | |
|---|---|---|---|
| 1,509,824 A | 9/1924 | Booth et al. | |
| 4,576,725 A | 3/1986 | Miura et al. | ............. 252/62.51 |
| 5,030,669 A | 7/1991 | Hendrickson et al. | ...... 523/333 |
| 5,106,533 A | 4/1992 | Hendrickson et al. | ...... 252/314 |
| 5,128,081 A | 7/1992 | Siegel et al. | ................... 264/81 |
| 5,372,629 A | * 12/1994 | Anderson et al. | .............. 75/332 |
| 5,738,705 A | * 4/1998 | Anderson et al. | .............. 75/332 |
| 5,857,840 A | 1/1999 | Suda et al. | ................. 417/302 |
| 5,958,329 A | 9/1999 | Brown | ........................ 266/176 |
| 6,267,942 B1 | 7/2001 | Mori et al. | .................. 423/338 |

FOREIGN PATENT DOCUMENTS

EP     0 209 403 A2     1/1987

* cited by examiner

*Primary Examiner*—George Wyszomierski
(74) *Attorney, Agent, or Firm*—Mark A. Litman & Assoc. P.A.

(57) ABSTRACT

A process and apparatus prepares and collects metal nanoparticles by forming a vapor of a metal that is solid at room temperature, the vapor of the metal being provided in an inert gaseous carrying medium. At least some of the metal is solidified within the gaseous stream. The gaseous stream and metal material is moved in a gaseous carrying environment into or through a dry mechanical pumping system. While the particles are within the dry mechanical pumping system or after the nanoparticles have moved through the dry pumping system, the vaporized metal material and nanoparticles are contacted with an inert liquid collecting medium.

15 Claims, 1 Drawing Sheet

PROCESS FOR THE MANUFACTURE OF REACTED NANOPARTICLES

BACKGROUND OF THE INVENTION

1. Field of the Invention

Figure 1:
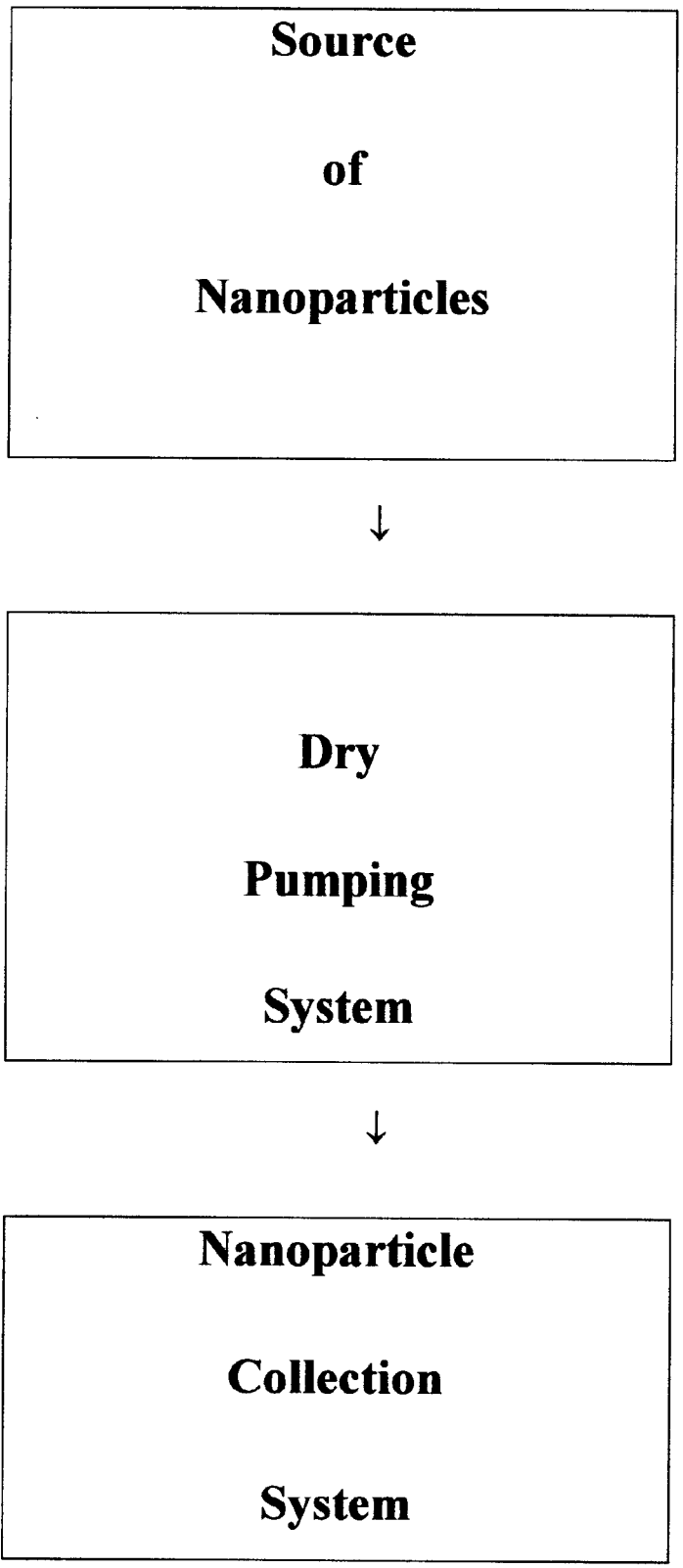

Particles, and particularly nanoparticles find a wide range of use as fillers, active media, explosives, magnetically sensitive materials, decorative materials, taggants, and reflective material. The present invention relates to the field of nanoparticle manufacture and apparatus for the manufacture of nanoparticles, and particularly for the manufacture of nanoparticles that have been reacted during manufacture, particularly surface reacted or surface coated.

2. Background of the Art

Many processes are available for the manufacture of small particles and especially small metal particles. These processes cover a wide range of technologies and exhibit a wide range of efficiencies. Some processes produce dry particles, while other processes produce particles in liquid dispersions.

Numerous references have appeared describing use of the gas evaporation technique to produce ultrafine metal powders, especially magnetic metal/metal oxide powders (often referred to as magnetic pigments). These appear to exclusively refer to a dry process and do not involve contact with liquids. Yatsuya et al., Jpn. J. Appl. Phys., 13, 749 (1974), involves evaporation of metals onto a thin film of a hydrocarbon oil (VEROS technique) and is similar to Kimura (supra). Nakatani et al., J. Magn. Magn. Mater., 65, 261 (1987), describe a process in which surface active agents stabilize a dispersion of a ferromagnetic metal (Fe, Co, or Ni) vaporized directly into a hydrocarbon oil to give a ferrofluid using a metal atom technique. The metal atom technique requires high vacuum (pressures less than $10^{-3}$ torr) such that discrete metal atoms impinge onto the surface of a dispersing medium before the metal atoms have a chance to contact a second species in the gas phase. In this metal atom process, nucleation and particle growth occur in the dispersing medium, not in the gas phase. Thus, particle size is dependent on the dispersing medium and is not easily controlled. Additionally, U.S. Pat. No. 4,576,725 describes a process for making magnetic fluids which involves vaporization of a ferromagnetic metal, adiabatic expansion of the metal vapor and an inert gas through a cooling nozzle to condense the metal and form small metal particles, and impingement of the particles at high velocity onto the surface of a base liquid.

Kimura and Bandow, Bull. Chem. Soc. Japan, 56, 3578 (1983) disclose the nonmechanical dispersing of fine metal particles. This method for prepares colloidal metal dispersions in nonaqueous media also uses a gas evaporation technique. General references by C. Hayashi on ultrafine metal particles and the gas evaporation technique can be found in *Physics Today*, December 1987, p. 44 and J. Vac. Sci. and Tech., A5, p. 1375 (1987).

EPA 209403 (Toyatoma) describes a process for preparing dry ultrafine particles of organic compounds using a gas evaporation method. The ultrafine particles, having increased hydrophilicity, are taught to be dispersible in aqueous media. Particle sizes obtained are from 500 Angstroms to 4 micrometers. These particles are dispersed by ultrasound to provide mechanical energy that breaks up aggregates, a practice that in itself is known in the art. The resulting dispersions have improved stability towards flocculation.

Other references for dispersing materials that are delivered to a dispersing medium by means of a gas stream include U.S. Pat. No. 1,509,824, which describes introduction of a molecularly dispersed material, generated either by vaporization or atomization, from a pressurized gas stream into a liquid medium such that condensation of the dispersed material occurs in the liquid. Therefore, particle growth occurs in the dispersing medium, not in the gas phase, as described above. Furthermore, the examples given are all materials in their elemental form and all of which have appreciable vapor pressures at room temperature.

U.S. Pat. No. 5,030,669 describes a method consisting essentially of the steps: (a) vaporizing a nonelemental pigment or precursor to a nonelemental pigment in the presence of a nonreactive gas stream to provide ultrafine nonelemental pigment particles or precursor to nonelemental pigment particles; (b) when precursor particles to a nonelemental pigment are present, providing a second gas capable of reacting with the ultrafine precursor particles to a nonelemental pigment and reacting the second gas with the ultrafine precursor particles to a nonelemental pigment to provide ultrafine nonelemental pigment particles; (c) transporting the ultrafine nonelemental pigment particles in said gas stream to a dispersing medium, to provide a dispersion of nonelemental pigment particles in the medium, the particles having an average diameter size of less than 0.1 micrometer; wherein the method takes place in a reactor under subatmospheric pressure in the range of 0.001 to 300 torr.

U.S. Pat. No. 5,106,533 provides a nonaqueous dispersion comprising pigment particles having an average size (diameter) of less than 0.1 micrometer dispersed in an organic medium That invention provides an aqueous dispersion comprising certain classes of inorganic pigment particles having an average size (diameter) of less than 0.1 micrometer dispersed in a water or water-containing medium. The dispersions require less time for preparation, are more stable, have a more uniform size distribution, a smaller number average particle diameter, fewer surface asperities, and avoid contamination of dispersed material due to the presence of milling media and the wear of mechanical parts, these problems having been noted above for dispersions prepared by conventional methods employing mechanical grinding of particulates. Additionally, no chemical pretreatment of the pigment is required in order to achieve the fine particle sizes obtained in the final dispersion. The pigments of the dispersions are found to have narrower size distributions (standard deviations generally being in the range of ±0.5 x, where x is the mean number average particle diameter), are more resistant to flocculation (i.e., the dispersions are stable, that is they are substantially free of settled particles, that is, no more than 10% of the particles settle out for at least 12 hours at 25° C.), and demonstrate superior overall stability and color as demonstrated by lack of turbidity, by increased transparency, and by greater tinctorial strength, compared to mechanically dispersed pigment dispersions. Furthermore, the method requires no mechanical energy, such as ultrasound, to break up aggregates. Aggregates do not form since there is no isolation of dry ultrafine pigment particles prior to contacting the dispersing medium. The dispersions of any organic or inorganic pigment or dispersion that can be generated from a pigment precursor, are prepared by a gas evaporation technique which generates ultrafine pigment particles. Bulk pigment is heated under reduced pressure until vaporization occurs. The pigment vaporizes in the presence of a gas stream wherein the gas preferably is inert (nonreactive), although any gas that does not react with the pigment may be used. The ultrafine pigment particles are transported to a liquid dispersing medium by the gas stream and deposited therein by bubbling the gas stream into or impinging the gas stream onto the dispersing medium.

U.S. Pat. No. 6,267,942 describes a process for manufacture of spherical silica particles. Silica gel particles to be dispersed in a mixed solution of an alkali silicate and an acid are required to have an average particle size of from 0.05 to 3.0 micrometers. In a case where the average particle size of the silica gel particles is smaller than 0.05 micrometers, mechanical strength of the spherical silica particles to be obtained will be low, and irregular particles are likely to form, such being unsuitable. Similarly, in a case where the average particle size of the silica gel particles is larger than 3.0 micrometers, mechanical strength of the spherical silica particles to be obtained will be low, and irregular particles are likely to form, such being unsuitable. The more preferred range of the average particle size of the silica gel particles is from 0.1 to 1.0 micrometers. A more recent advance in particle coating technology is the use of fluidized bed systems, and in particular, magnetic fluidized bed systems such as that shows in U.S. Pat. No. 5,962,082 (Hendrickson et al.). There, a magnetic field fluidizes a bed of magnetically responsive particles. The magnetically responsive particles and/or other particles carried into a fluidized bed are coated with a material (e.g., a liquid) provided in the fluidized environment. The coating composition may even be transferred from the magnetic particles to non-magnetic particles. This process provides excellent control over the coating thickness, can produce large volumes of coated particles, and provides many other advantages.

U.S. Pat. No. 5,958,329 describes a method and apparatus for producing nanoparticles (there defined as from 1 to 50 nano-meter diameter particles) at a high rate. Two chambers are separated by a narrow duct. A source material is provided from a lower chamber where the source material is heated (e.g., to vaporization and then continuously fed into an upper chamber. In the upper chamber, nanoparticles are nucleated, the nanoparticles being formed when the vapor fed from the lower chamber collides with a gas (inert or reactive) in the upper chamber. A cooled deposit site (e.g., defined as finger 107) collects the particles, which are then scraped from the collection site. The particles are said to move to the collection site in a natural connective flow stream.

U.S. Pat. No. 5,128,081 describes a method of preferential phase separation of aluminum oxide nanocrystalline ceramic material. The nanoparticles are collected on a cold surface (20). Following oxidation of the particles, a vacuum chamber (in which the particles were formed) is evacuated and the oxide particles are collected and consolidated under various atmospheric conditions, such as vacuum and selectively with oxygen and/or air.

The collection process in these particle manufacturing and particle treating processes is cumbersome, inefficient, costly, time-consuming and damaging to the particles. For the collection process, the chamber must be opened and particles scraped from the deposition surface. This requires a long term shut down of the system. Scraping of particles from the deposition surface will fracture some particles and leave others agglomerated. Scraping can also damage the deposition surface. The small elongate finger deposition surface allows for the production and collection of only small amounts of materials layering of collected particles reduces the efficiency of deposition onto the surface. Coating of the particles can be done, but only as re-dispersion of the dried and agglomerated particles.

An alternative method of particle collection is filtration. This is performed by placing in sequence a source of particles, a filtration medium and a vacuum source. The filter has two surfaces, one front surface facing the particle source and the other rear surface facing the vacuum source. The reduced pressure at the rear surface allows the higher pressure at the font surface to push gas and particles against the filter where the particles are entrapped. There are a number of problems in a filtration system, particularly when it is used with nanoparticles. For example, to collect nanoparticles having an average particles diameter of from 1 to 100 nanometers, the largest pore size in the filter must be less than about 1 nanometer. It is difficult to maintain an effective pressure across that filtration surface, even before particles start collecting. As nanoparticles collect on the filter surface, gas flow (and pressure driven movement) become more restricted, fewer particles can collect, and process efficiency diminishes. The particles clog pores rapidly and particles do not collect efficiently.

U.S. Pat. No. 5,857,840 describes a vacuum pump system for making a closed container vacuous, comprising a vacuum pump and a dust collector provided on a pipe connecting the closed container and the vacuum pump, the pipe including:

a main pipe having a first main pipe which connects the closed container and the collector and a second main pipe which connects the centrifugal collector and the vacuum pump;

a bifurcated pipe which is branched out from the first main pipe and connected to the vacuum pump;

a metal mesh dust collector disposed on the bifurcated pipe; and pipe switching means for switching over between the main pipe and a bifurcated pipe.

The dust collector is provided intermediate the source of dust and vacuum pump, which may include a dry pump.

SUMMARY OF THE INVENTION

A particle collection system with increased collection efficiency for the collection of nanoparticles comprises a source of particles, a dry pumping system, and a particle collection surface. The position of a dry pumping system in advance of the particle collection surface maintains a particle moving effort, without wetting particles and causing them to agglomerate, and increases collection efficiency. The source of particles usually comprises an evaporation/condensation process with an inert gas flow into the evaporation/condensation system. Particles are then reacted by introducing a reactive gas with or in addition to the inert gas within or after at least partial condensation of particles. By providing the reactant as a vapor that can intimately associate or react with the surface, excellent control over the degree and uniformity of reactions, including in situ polymerization on the surface of particles, is greatly enhanced.

BRIEF DESCRIPTION OF THE FIGURES

FIG. 1 shows a system for the manufacture of reacted nanoparticles according to the present invention.

DETAILED DESCRIPTION OF THE INVENTION

A particle collection system with increased collection efficiency for the collection of nanoparticles comprises a source of particles, a dry pumping system, and a particle collection surface. The position of a dry pumping system in advance of the particle collection surface maintains a particle moving effort, without wetting particles and causing them to agglomerate, and increases collection efficiency. The source of particles usually comprises an evaporation/condensation process with an inert gas flow into the evaporation/condensation system. Particles are then reacted by introducing a reactive gas with or in addition to the inert gas within or after at least partial condensation of particles. By providing the reactant as a vapor that can intimately associate or react with the surface, excellent control over the degree and uniformity of reactions, including in situ polymerization on the surface of particles, is greatly enhanced.

The placement of the collection units between the nanoparticle source and vacuum pumps causes severe problems in maintaining system vacuum and related high evaporation rates. Wet collection systems are difficult to operate in a vacuum environment; however, the operation of wet collection systems provides slurries in a number of different solvents, which can be post-treated by in-situ polymerization techniques to coat the nanoparticles. The resulting slurries can be post treated by in-situ polymerization methods to coat the particles in solution. The particles in the resulting slurries can be coated with fluoropolymers, such as teflon and polyvinylidene difluoride (PVdF). This differs from earlier work using of high pressure reactor technology to provide a teflon or PVdF coating. This is the first known application of these polymers in an in-situ polymer coating process.

A source of nanoparticles is provided. The source may be a primary source where particles are being manufactured (e.g., sputtering, spray drying, aerial condensation, aerial polymerization, and the like) or may be preferably provided by evaporation and condensation within a process stream. The source of nanoparticles may also be a secondary source of particles, where the particles have been previously manufactured and are being separately treated (e.g., coating, surface oxidation, surface etching, and the like). These nanoparticles are provided in a gaseous medium that is of a sufficient gas density to be able to support the particles in flow. That is, there must be sufficient gas that when the gas is moved, the particles will be carried. With nanoparticles (e.g., particles having number average diameters of 0.5 or 1 to 100 nm, preferably 1 to 80 nm, or 1 to 70 nm, and as low as 1 to 50 nm) only a small gas pressure is needed, such as at least 0.25 Torr although higher pressures greater than 0.25 Torr, greater than 0.4 Torr, greater than 0.6 Torr, and greater than 0.75 Torr greater than 0.9 Torr are preferred.

The gas-carrying medium may be or have been reactive with the particles or may have some residual reactive materials in the gas. It is preferred mainly for preservation of carrying and collecting surfaces, that the gas is relatively inert to the apparatus environment. Gases such as nitrogen, carbon dioxide, air and the like are preferred.

The propulsion system for the gas carrying medium and the nanoparticles is a dry mechanical pumping system for gases. A dry pumping system is used to prevent contamination of the particles by lubricants. These dry pumping systems for gases are well known in the semiconductor industry for conveying air, particulate and vapors without collection occurring in the pump. They are pumping systems that utilize oil-less seals to maintain vacuum conditions at the pump inlet. Examples of such dry pumps and dry vacuum pumps in the literature are found in U.S. Pat. No. 4,452,572 (Robert Evrard) generates a dry vacuum when acting as an additional stage to a conventional vacuum pump. It cites a tubular diaphragm that admits a pressure differential across the diaphragm to allow the diaphragm to conform to the contour of the pumping chamber body and thus expel gas via a top valve. U.S. Pat. No. 5,971,711 describes a control system for pumps, including dry pumps based on a Roots system pump.

U.S. Pat. No. 6,050,787 provides a dry pump comprising a magnetically responsive elastic tube stretched onto, thereby sealing to, a shaft with inlet and outlet ports at or adjacent to it's ends of the tube. Local to the inlet port a magnetic field is generated in the enclosing body. This field is substantially concentric to the tube, which then responds by expanding circumferentially towards the magnetic field. This creates a volume between the tube and shaft, the length of tube outside the influence of the magnetic field remains sealed upon the shaft. Subsequent movement of the magnetic field along the axis of the pump gives transport of this volume and any media now enclosed within it from the inlet port to the outlet port, whereupon reduction of the magnetic field results in exhaustion of the volume. This cycle results in pumping action.

Other general disclosures of mechanical dry pumps are provided in U.S. Pat. Nos. 6,090,222; 6,161,575; 5,846,062 (which describes a screw type dry vacuum pump having dual shafts is disclosed, whereby the process gas is transported through three compartments, a gas admittance pump section, a central drive motor section, and a gas discharge pump section. By placing the drive motor in the center of the pump, it becomes possible to design a pump having the dual shafts supported only at one end, thus enabling to mount the rotors at the free ends of the pump which are closed with end plates which can be removed easily for servicing the pump sections. Synchronous operation of the dual shaft pump by magnetic coupling enables to lower power consumption and to extend the range of operable pressures.

The collecting medium for the nanoparticles may comprise electrostatic surface collectors, electrostatic filter collectors, porous surfaces (e.g., fused particle surfaces), centrifugal collectors, wet scrubbers, liquid media collectors and physical filter collectors. The liquid media collectors) with subsequent separation of the liquid and the particulates) are more amenable in the practice of the present invention. Also know as wet scrubbers, these liquid collection media are more amenable to this arrangement due to process and safety factors allowing more volatile solvents to be utilized away from the formation chamber for the nanoparticles. Wet scrubbers also provide slurries suitable for post-treatment and polymer coating by in-situ polymerization, particularly in the case of fluoropolymer coatings. Examples of this are Teflon, Polyvinylidene difluoride (PVdF), and their respective copolymers. This differs from earlier work in the field using high pressure reactor technology to achieve the polymer coating. This technique can be used to coat metallic particles, pigments, oxides, and nitrides. This is the first know application of these polymers in the in-situ polymer coating process.

The use of the present arrangement of nanoparticle source, dry pump and collector has been found to increase particle collection efficiency by as much as 100% in comparison to the conventional source, filter pump system, even where the same nanoparticle source is present, the same filter and the same pump is used in the different order. The utilization of this arrangement of the pumping scheme may also benefit the collection of the nanoparticles. By injecting low volatility solvents into the inlet of the pump with the nanoparticle loaded gas stream, the dry pump may also be utilized as a wet scrubber with better than 90% collection efficiency. Suitable solvents are the various available Isopar® media and Purasolv® media.

Small particles of metals are prepared by an evaporative method with a unique collection and reaction method that increases the production efficiency of the process by dramatic degrees. The process comprises evaporating a metal and then providing a mechanical pump that either draws the gas phase metal into a liquid condensation-collection zone or combines a liquid condensation-collection zone within the mechanical pump. The non-metal gaseous material remaining after condensation removal of the metal material is withdrawn from the material stream, while the liquid condensing phase with the condensed metal particles is separated, the liquid condensing phase carrier removed, and the particles collected. As compared to known prior art methods, the use of the intermediate positioned mechanical pump or contemporaneous mechanical pump and condensation-collection zone increases the overall collection/manufacturing efficiency of the process by at least 25%.

The existence of nanoparticulate materials such as metals, organic materials, metal oxides, halogenides and other pigments has been known for several years now; however, the production of these materials is still extremely low from the existing processes. This has had a detrimental effect on the availability and therefore the utilization of these materials in various products, especially in the area of energetic materials concerning nanoparticulate aluminum. Several of the military and civilian applications of this material have remained unattained due to the lack of suitable large scale supplies of this material to incorporate into the end products or at least proof out these materials in research and development work.

The most frequently used technique to form nanophase materials, such as metals, is the inert gas condensation, or dynamic gas condensation, method (Siegel, R. W. and Eastman, J. A., Material Research Symposium Proceedings, 132, p. 3, 1989; and Granquist, C. G. and Buhrman, J., J. Appl. Phys., 47, p. 2200, 1976). In this technique, a metal is vaporized and recondensed by contact with a low pressure flux of inert gas. The typical method used to melt and vaporize the metal to be converted into nanophase metals has been resistive heating. Through the use of either a tungsten or tantalum heating element or an intermetallic ceramic bar, metal, such as aluminum, is evaporated from conductive heating by contacting the hot surfaces of the material. The use of intermetallic ceramics is favored over the metallic heating elements due to the ability of metals may corrode other metals by an alloying process. This causes shorting of the resistive circuit by overamping, etc. This has resulted in the use of the intermetallic materials (AlN, BN and $TiB_2$) in aluminum evaporation.

"Flash" evaporation is that condition where the molten metal is superheated beyond the boiling point of the aluminum at certain conditions and is instantly converted to vapor (Learn, A. J., Thin Solid Films, 20, p. 261, 1974). In a high vacuum system, it is relatively easy upport both the melting and vaporization of the metal if the appropriate amounts of energy are available. For the resistive heating method; however, there is only enough energy available to vaporize small amounts of material at one time. This is often why wire feed mechanisms are commonly used with resistive heating/vaporization methods (Rynee, D. M., Solid State Tech., 11, p. 48, 1968; Learn, A. J., J. Electrochem. Soc., 123(6), p. 894, 1976). As a conductive method of heating and vaporization, the energy transferred by conduction in the resistive heating methods is maximized by use of a small contact area that continually evaporates small amounts of material supplied by the wire feed mechanism. The wire feed mechanism is uniquely suited to the requirements of the resistive heating/vaporization techniques, and the evaporation/production rates are then determined by the speed of the wire feed mechanism matching, but not exceeding the amount of metal that could be evaporated by the conduction-driven methods. Even at high voltages and feed rates; however, the end production rate is not an industrially suitable method for the manufacture of aluminum nanoparticles. A typical resistive bar operates at 4 volts and 830 amps and dissipates a power of 3324 watts. The temperature generated is ~1500° C. A typical evaporation rate is 0.10 grams/min per bar. This is quite low and batteries of resistive bars are often used to form an aggregate production rate suitable for vapor coating. This is sufficient for vapor coating substrates to a depth of less than two-tenths of a micron as is typically done for Mylar polyester and nylon web coatings in commerce. Although this would suffice for a vapor coating operation, it is not a scaleable procedure for large scale nanoparticle production.

Resistive heating also has other drawbacks as well. It has been observed that a temperature gradient appeared in the resistively heated bar from convection when exposed to the inert gas needed to nucleate the vapor into the nanoparticles. The ends of the bar would be hotter than the center where the metal would be fed onto the bar. This has two outcomes. First, the excess energy needed to vaporize the aluminum metal is lost due to convective heating of the gas stream. Second, the temperature of the bar also drops considerably due to the convective losses. This drop in temperature puts the overall operating parameters of the system (temperature, pressure) into undesirable areas. In relative comparative terms, undesirable effects correspond to the slow evaporation of water below its boiling point versus the rapid evaporation and steam evolution that occurs when the water is superheated beyond its boiling point where the water is converted directly into steam.

The additional pressure that occurs from the introduction of a gas stream into the system is also a factor. Most rough vacuum pumps can reach ultimate pressures of less than 50 mTorr in a closed vacuum system without the introduction of gas into the system. The addition of gas flow to the vacuum chamber changes this base pressure considerably as the expansion of the ambient condition gas at near vacuum yields a higher gas volume that must be pumped from the system. This base pressure will also increase with the presence of line expansions and constrictions that occur with the presence of vacuum chambers and traps in the system (Brunner, W. F. and Batzer, T. H., "Practical Vacuum Techniques", Krieger Publishing Co., New York, 1974; and O'Hanlon, J. F., "A User's Guide to Vacuum Technology", Wiley, N.Y., 1980. This increase in base pressure coupled with the temperature drops observed with gas contact on the resistively heated bar puts the operating parameters of the system below the vapor pressure curve.

For this inert gas condensation process to work at a reasonable production rate, a method of vaporizing the metal in this case, aluminum, must be found that allows a high operating temperature for the system while maintaining the proper gas flow and pressure characteristics in the system.

A high vaporization rate of material may also be effected by inductive heating. With the ability to couple directly into the metal itself to heat and vaporize it, it is an obvious technique to utilize in a large scale production method. Due to the ability to input the energy available directly into the metal itself, there may also be a larger operating window in terms of temperature and pressure. A small scale induction unit used may be a Mark 6, 10 kHz, 15 kW Pillar unit. Due to coil and line losses, only 80% of the 15 kW is available (12 kW) for introduction into the metal charge in the induction crucible. With the antiferroelectric behavior of aluminum metal, only 30 to 50% of this power can couple effectively with the metal charge to heat and vaporize it. The coupling of this technology with the melting and vaporization of metals has been well established since World War II (Davies, E. J., and Simpson, P., "Induction Heating Handbook", McGraw-Hill, London, 1979;Davies, E. J., "Conduction and Induction Heating", Peregrinus, London, 1990). The results from the 15 kW unit employed here can be scaled to a standard 600 kW unit or higher power depending on the custom design and manufacture available for these systems. Vacuum chambers and induction coils are readily available or can be manufactured easily. This comprises the first part of the non-public system developed during this project. The second part of the system is the vacuum pumping system, which has been well established and developed from the vapor coating and semiconductor industries. The third part of the system is the collection of the metal nanoparticles and their dispersion into liquid media. The last part of the system is the fluoropolymer coating portion of the process where the nanoparticles are coated with the protective polymer coating to prevent oxidation.

Collection of the nanoparticles is also a problem for the production of nanoparticulate slurries. Most previous attempts for the production of nanophase materials consisted of vaporizing the metal feedstocks at ultralow vacuum conditions and collecting the nanoparticles formed on a liquid nitrogen cold finger system by thermophoresis or the walls of a large volume expansion chamber by impingement and settling (Siegel, R. W. and Eastman, J. A., Material Research Symposium Proceedings, 132, p. 3, 1989; Granquist, C. G. and Buhrman, J., J. Appl. Phys., 47, p. 2200, 1976). This has several disadvantages in collection including the inability to form unique unagglomerated nanoparticles. Although mean particle sizes of <10 nm are claimed, this is mainly the primary particle size of the crystallites of the material which are formed. These crystallites are agglomerated to particle sizes which are much higher than this mean crystallite size during the collection process. This collection method also leads to oxidation problems with pure metal systems as the surfaces of the dry, reactive nanoparticles need to be passivated in some manner before further handling. This is typically done by oxidizing the outer surface of the nanoparticles by the controlled admission of oxygen to the chamber to form a thin oxide layer to eliminate the possibility of their burning in uncontrolled atmospheres. This oxidation essentially destroys useful fuel in the bulk of the nanoparticle. Most passivation layers for aluminum metals are up to 10 nm in depth. For a 30 nm or lower diameter particle, this is most of the metal present. However, thinner layers of the passivation oxide have been achieved with difficulty (Granquist, C. G. and Buhrman, J., J. Appl. Phys., 47, p. 2200, 1976; Aumann, C. E., Skofronick, G. L. and Martin, J. A., J. Vac. Sci. Tech. B, 13(3), p. 1178, 1995. Dixon, J. P., Martin, J. A., and Thompson, D., U.S. Pat. No. 5,717,159, (February 1997).

Collection in liquids yields two advantages. First, it protects the surface of the particles from contamination or oxidation by providing a temporary liquid cover over them. Second, the process provides a slurry that can be handled in a safe fashion. The liquid dispersion medium can be a solvent, polymer monomer, or prepolymers (Dixon, J. P., Martin, J. A., and Thompson, D., U.S. Pat. No. 5,717,159, (February 1997); Hendrickson, W. A., Wright, R. E., Allen, R. C., Baker, J. A., and Lamanna, W. M., U.S. Pat. No. 5,030,669.

Previous work with evaporated pigments has found that the immediate dispersion of pigment nanoparticles is often beneficial in the formation of a stable dispersion of nanoparticles in the collection liquid. The collection systems previously utilized were sparge units that bubbled the dust-laden gas through the collection liquid and scrubbed the nanoparticle materials from the gas itself.

Fluoropolymer coatings to prevent contamination of the various nanoparticles were initially employed in the background work on the present project. The application of these coatings was done by an in-situ growth of the coatings on the aluminum nanoparticles in the non-aqueous slurries formed. This is similar to the work where polystyrene, polyaniline and other coatings were applied to inorganic oxides, sulfides or chalcogenides. The use of a fluoropolymer was to provide a pliable, noncracking coating to the outside of the reactive nanoparticle surface. In contrast to the former particle coating experiments, these polymerization reactions need to be run in high pressure reactors to liquefy the gaseous fluoromonomers and allow the polymerizations to proceed at a reasonable rate. However, this technology is well developed, and standard equipment and parts are available for this process. Fluoropolymers, such as polyvinylidene fluoride (PVdF) and its copolymer Viton®, have been produced commercially on an industrial scale since the early 1960's (Rexford, D. R., U.S. Pat. No. 3,051,677; and Lo, E. S., U.S. Pat. No. 3,178,399.

Although a suitable system for the production of small scale samples, the prior art collection process was not considered a viable method for the large scale production of this material.

A substantially improved vacuum system was designed that deepened the system vacuum to values appropriate to flash evaporate metals utilizing the induction unit power. This did increase the production rate of the system. Although the evaporation rate and corresponding nanopowder production rate were increased substantially, the ability to collect the nanoparticle materials by sparging the dust-laden gas through a collection liquid was limited severely. To achieve the higher production rate through deepening the system vacuum, a higher gas flow also occurred, which increased the amount of gas sparged through the collection liquid by a factor of four. With the lower flow rate (~1 liter/min) at the lower production rates, the collection of the nanopowder was nearly 80–90% using the sparge collection vessels. With the higher flow rate of gas through the sparge vessels, the collection of the nanopowder dropped severely and the entrainment of the slurry in the gas stream also became a problem as the liquid was blown out of the collection system.

The slurry outflow out of the collection vessels was never halted, even after upsizing the sparge vessel to approximately 5 gallons. This size of vessel was too large to handle easily or safely with the nano-metallic slurry present. Mesh packings in the collection vessels were also employed to stop the entrainment of the slurry from the collection vessel, but also failed to halt the entrainment of the liquid in the gas stream. A two gallon collection vessel with a cyclone attached to recycle the gas entrained slurry back to the vessel was eventually employed to sparge the gas and re-collect the liquid slurry, but the collection efficiency of the sparging collection unit dropped to only 20% of the total powder evolved. Combined with losses to the system from powder build-up, this was unacceptable.

A derivation of a proprietary technique was utilized to overcome this collection problem. Former work arrived at the use of high power aspirators to both collect the nanoparticles produced in liquids and also to supply vacuum to the evaporation chamber at the same time. Although it worked sufficiently well at the lab scale, it was difficult to implement at the pilot plant scale for materials other than pigments. This technique is now significantly improved in this application with some variations to increase the system vacuum. With the use of the combined liquid collection/vacuum supply system, many of the prior obstacles to high rate evaporation and liquid collection were overcome. This current capability of the system is a collection efficiency of nearly 90% of the material contacting the scrubbing system.

The evaporation rate of 10 gm/min for aluminum smetal indicates that there is considerable energy loss in the system and that only 25–33% of the total power of the system is being used to vaporize the material. These losses may be occurring in heating the crucible, heating the cold aluminum to its melting and boiling points or in general convective heat losses to the gas stream in the system.

Although the evaporation rate of material per hour may be in the 500–600 gm/hr range, other factors impact on the efficiency and productivity of the system. The crucible for this work holds ~20 gms of material. Although a minor amount of time is lost in preheating the aluminum metal, the aluminum metal has been nearly vaporized after approximately two minutes. The overall production rate; however, is also impacted by the time needed to replenish the crucible after each successive charge is gone. The initial wire feed spools utilized in the system were aluminum 1100 grade $3/64$ inch diameter wire with a weight of 0.6 grams/foot of wire. This required that nearly 40 ft of wire be fed into the crucible for each metal charge. This would require more than 30 minutes with the normal mechanical wire feeds utilized in aluminum vaporization operations, but the simple hand driven mechanism on the present system allowed the feed time to the crucible to be reduced to one-third of that time.

The large-scale production of material from this system also has consequences in terms of particle size control and materials corrosion. There are often references in the literature about the ability to tailor the particle size of nanoparticles formed by the inert gas condensation method by increasing the back pressure of inert flux gas in the system (Siegel, R. W. and Eastman, J. A., Material Research Symposium Proceedings, 132, p. 3, 1989; Granquist, C. G. and Buhrman, J., J. Appl. Phys., 47, p. 2200, 1976; Aumann, C. E., Skofronick, G. L. and Martin, J. A., J. Vac. Sci. Tech. B, 13(3), p. 1178, 1995).

The coating and reactive aspects of the invention may be used with any material that can be evaporated below 3000° C. and condensed to a solid at room temperature, including metals, organics, ceramics, glasses, inorganics generally and the like, although the primary description herein will be directed towards metals. The first requirement for any prospective metals to be utilized in the system is that of melting point. For a system that can only reach maximum temperatures of 1600–1700° C., refractory metals, such as tantalum, molybdenum, and tungsten, are beyond the system's capability. High melting point metals, such as titanium, zirconium and platinum, are also beyond the systems energy capability. The inductive field of the system would mainly heat these metals to temperatures of ~1600° C. as was observed on crucible tests for some of these materials.

With ferromagnetic metals, such as iron, cobalt and nickel, utilization of the present technique is possible, but difficult to perform at the same rates as aluminum due to their high melting points. Although there is an area where iron can be flash evaporated from the system, the extremely low pressure needed would preclude the utilization of all but very high capacity vacuum systems. Although other types of pumps, such as diffusion pumps, could be used to achieve the low vacuum pressures needed in conjunction with roughing pumps, these types of pumps do not operate under the gas flow conditions needed to nucleate the nanoparticles from the gas phase. Although this would be the preferred equipment in a static vacuum system, the addition of gas flow eliminates their usage. The evaporation of these ferromagnetic metals would be difficult without high capacity systems and even their dispersion would be problematic. These nanoparticles were formed at a very low production rate in the older production systems (e.g., 1–2 grams/day).

A full-scale system would have four major pieces of equipment to produce either a solvent or solvent/prepolymer nanoparticle slurry. The four main pieces of equipment would be 1) the induction power source, 2) the vacuum chamber and feed systems, 3) the vacuum pumps and 4) the liquid collection system. This is for the largest induction unit presently made on a commercial basis Compared to other more costly equipment that vendors have claimed can do the same tasks, this system has an exceedingly low cost for capital equipment in this project. Increases of production or efficiencies of the system during scale-up could have massive impacts on price of the product materials.

In addition to the detonation or military applications, this fully developed system for the production of nanoparticles, particularly pigment or metal nanoparticles particles and especially aluminum nanoparticles and their dispersions will find significant outlets in forming pigment dispersions for paints, toners, inks, colorant systems, plastic/resin coloration, coating colorization, pharmaceutical coloration, and the like.

Dry, coated and uncoated nanoparticulate pigment samples (5 grams) have also been manufactured for commercial primer and toner usage. Dry uncoated samples of pigment nanoparticle inkjet inks for the production of printing inks and toners, and other nanoparticulate pigment dispersions have been evaluated for use in inkjet inks.

The production and efficiency of collection rate of nanoparticulate materials has been increased significantly to rates that are scaleable to large sized production lots by practice of the invention. The utilization of nanophase metal particles in particular technical areas may also be dependent, in part, on the dispersion of the nanoparticles into particular liquid media of choice. An added bonus of the program has been the improved ability to collect and disperse the nanoparticles into different liquid media. This liquid media can be solvents, carriers, reactive compositions, coating solutions, oils, polymer monomers or prepolymers or mixtures of these liquids. This feature, in addition to the increased collection/condensation efficiency is an added advantage of the inventive process over other processes presently available in this field. The dispersion of these nanoparticles into these different liquids aids in their ease of processing and also in the protection of any reactive surfaces from oxidation and even physical damage.

The technology that has been developed by the inventors also has applications outside the narrow confines of any specific metal or alloy, but is generically useful for any metal or alloy that can be provided in a vapor state and which can be condensed by cooling in a liquid medium. The particles can also be collected wet in different liquid media in which they can form stable dispersions for use in a wide variety of technical areas such as discussed above.

In this application:

"ultrafine" means having a mean number average diameter of less than 0.1 micrometer, preferably in the range of 0.001 to 0.1 micrometer, more preferably in the range of 0.001 to 0.08 micrometer, most preferably in the range of 0.001 to 0.05 micrometer; and having a standard deviation in the range of .±0.0.5 x, where x is the mean number average particle diameter;

"gas evaporation technique" means any method involving the evaporation of a metal, metals or alloys in the presence of a non-reactive gas to provide ultrafine metal or alloy particulate.

The present invention is capable of providing an aqueous or nonaqueous metal or alloy dispersion comprising metal or alloy particles or an aqueous dispersion of these particles, the particles having a means number average particle diameter in the range of 0.001 to 0.1 micrometer (1 to 100 nanometers), preferably dispersed in a dispersing medium. Preferably the mean number average particle diameter is in the range 0.001 to 0.08 micrometer (1 to 80 nanometers) and most preferably 0.001 to 0.05 micrometer (1 to 50 nanometers). The dispersions can contain pigment from 0.001 to 50% by weight, preferably from 0.001 to 25% by weight, and more preferably, from 0.001 to 10% by weight of the total composition. Narrow size distribution ranges of less than ±25% or ±15% of the average diameter are also able to be formed and are desirable.

A non-limiting example of the manner in which a dispersion according to the present invention may be prepared includes:

a) vaporizing a metal, metals or alloy in the presence of a non-reactive gas stream (or introducing the vaporized metal into a non-reactive gas stream) or a reactive gas stream to provide ultrafine particles (especially metal and alloy particles), b) transporting the ultrafine particles suspended in the gas stream by a mechanical pump to a liquid dispersing medium, as for example, a mechanical pump located before the dispersing medium or containing the liquid dispersing medium, the gas containing the particles being forced into the liquid dispersing medium or the gas containing the particles intimately contacting the dispersing medium, to provide a dispersion of particles in the medium (with vaporized metal condensing in the liquid medium), c) the gas (absent the particles) is then separated from the dispersing medium (e.g., by bleeding out the gas, allowing the gas to rise to an exit area within a chamber, etc.), and d) the dispersing medium is then used to carry the collected metal or alloy particles as a dispersion or the dispersing medium is then optionally being separated from the pigment particles to provide non-dispersed metal or alloy particles.

Metals having a vaporization temperature below 3000° C. are well known in the art, and include, for example, Li, Na, K, Rb, Cs, Fr, Be, Mg, Ca, Sr, Ba, Ra, Y, La, Ac, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Al, In, Tl, Sn, Pb, mixtures and alloys of these metals and even the lanthanides and actinides, if desired.

Several methods are available for characterizing a particle dispersion. The most common involves the particle size distribution expressed as the weight percentage of particle falling within a given size range. Typical size limits for metal particles desired in the practice of this invention are about 0.01 to 1.00 micrometer (10 to 1000 nm).

These values are indicative of the overall range of particle sizes typically encountered after conventional dispersion techniques. The distribution of particle sizes is dependent on the means of particle formation. Where mechanical milling is used to comminute the particles, extremely wide distributions result.

In the present invention, the vapor phase of evaporated particles and the particles themselves may be generated by any evaporative process such as subliming pigments or any other evaporation process for pigments at subatmospheric atmospheric or superatmospheric pressures in the presence of a non-reactive gas to generate ultrafine metal or alloy particles and then effecting direct introduction into a dispersing medium such as described herein, has not been taught. Where the term "metal" is used herein, it is intended to include metals, mixtures of metals and alloys.

As noted above, dry organic pigments have also been generated by H. Toyotama (supra) using a gas evaporation technique. The reference teaches the need to provide mechanical energy in the form of ultrasound, which shows that, once isolated, the dry pigment particles have an affinity for each other and, therefore, energy must be provided to break the aggregates apart. One additional aspect of the present invention that can be used to differentiate the generation of metals from the pigment process of H. Toyotama in that the vacuum provided is dynamic and a constant flow of non-reactive gas stream is swept past the metal vaporization source, at rates that can be generally in the range of 25 to 2000 SCCM (standard cc's per minute) for a laboratory scale apparatus, during metal evaporation. Thus, while Toyotama is dependent on the residence time of the ultrafine particles in the growth zone (see Granqvist and Buhrman, J. Appl. Phys., 47, (1976), p. 2200) to determine the ultimate particle size obtained for a given pressure, the instant invention provides a secondary means for particle migration from the growth zone, i.e., convective currents are important as in H. Toyotama (supra) but also the non-reactive gas stream assists in carrying particles from the growth zone. Thus, at a given pressure, the present invention provides metal particles that are significantly smaller than pigment particles achieved in a static (Toyotama) system. Furthermore, the metal particles of the invention are introduced into the dispersing medium before they have a chance to aggregate, thus removing the need for external mechanical energy, such as ultrasound, to achieve a dispersed state.

Dispersing media useful in the present invention include any liquid, aqueous (where the metal does not rapidly react with water at collection conditions) or nonaqueous (for most metals). Fluids having a viscosity up to 100,000 P or more are envisioned as useful. Preferred viscosities are less than 5000 cP, more preferably less than 3000 cP, and most preferably less than 1000 cP. Representative dispersing media include water, gelatin/water emulsion, alcohol/water, including mixtures such as ethanol/water, glycerol/water, etc. and polar organic liquids such as acetone, 2-butanone, cyclohexanone, 2-undecanone, methanol, ethanol, isopropanol, glycerol, ethylene glycol, ethyl acetate, alkanes (e.g., hexane, cyclohexane), methyl methacrylate, 2-hydroxyethyhnethacrylate, chloroform, methylene chloride, alkylalkanolamines, such as 2-dimethylaminoethanol, 1-dimethylamino-2-propanol, 1-diethylamino-2-propanol, 2-dimethylamino-2-methyl-1-propanol, and 2-dibutylaminoethanol, and combinations thereof.

Useful nonpolar organic liquids include hexane, a mixture of isoparaffinic hydrocarbons, b.p. 156° C.–176° C. (Isopar G®, Exxon, Houston, Tex.), benzene, toluene, xylenes, styrene, alkylbenzenes, and combinations thereof. In addition, liquid polymers such as polydimethylsiloxane (e.g., DC200™ $MW_n$=200, Dow Chemical, Midland, Mich.), polydimethyl-co-methylphenylsiloxane (e.g., DC 704™, Dow Chemical), polyethylene glycol (e.g. Carbowax® 200, Carbowax® 400, and Carbowax® 600, $MW_n$= 200, 400, and 600, respectively, Union Carbide Corp., Danbury, Conn.), a polymer comprising perfluoropolyether segments (LTM™, 3M, St. Paul, Minn.), and polycaprolactones (Placcel™ 305, 303, 308, $MW_n$=300–850, Daicel Chemical Ind. Co. Ltd., Tokyo, Japan) may be used.

Additionally, external heat may be applied to melt a solid (e.g., a polymer, a wax, or any low melting organic compound such as naphthalene) and generate a liquid dispersing medium suitable for use in the present invention. Examples of solids that may be used include paraffin wax, low molecular weight polyester (e.g., FA™-300, Eastman Chemical Co., Rochester, N.Y.), and polyethylene.

The dispersing medium may be a pure liquid or a mixture of liquids and may contain additional ingredients, including inorganic and organic soluble materials and mixtures thereof. Such additives include surface-active agents, soluble polymers, insoluble particulates, acids, bases, and salts.

By surface active agent is meant an additive that has a preferred spatial orientation at an interface, e.g. large molecules having a hydrophilic head group and a hydrophobic tail (e.g. OLOA™ 1200, Chevron Corp., Richfield, Calif., and Amoco™ 9250, Amoco Chemical Co., Naperville, Ill.). The weight percent of surface active agent to dispersing medium can be from 0 to 20%, preferably 0 to 10%, and more preferably 0 to 5%. Other surface active agents useful in the present invention are well known to those skilled in the art.

Soluble polymers useful as additives in the present invention, for example, in the manufacture of pigmented films, include polystyrene, polystyrene-co-butadiene, poly (methyl methacrylate), poly(ethyl methacrylate), poly(butyl acrylate), poly(4-vinylpyridine), poly(2-vinylpyridine), poly (vinylpyrollidone), poly(2-hydroxyethyl methacrylate), poly (ethylene terephthalate), polystyrene-co-4-vinylpyridine, polystyrene-co-2-vinylpyridine, polyethyleneglycol, poly (ethylene oxide), poly(propylene oxide), polyethylene, polypropylene, poly(acrylonitrile), poly(phenyl vinylene carbonate), poly(vinyl acetate), poly(vinyl alcohol), poly (vinyl trifluoroacetate), poly(vinyl chloride), poly(ethylene-co-propylene adipate), poly(1,4-phenylene sebacate), poly (3,5-dimethyl-1,4-phenylene sulfonate), poly (.beta.-alanine), poly(hexamethylenesebacamide), poly(vinyl cymantrene-co-4-vinylpyridine), etc. The percent of soluble polymer in the dispersing medium may be from 0 to 70% by weight, preferably 0 to 50%, more preferably 0 to 30%, and most preferably 0 to 25%, or each range with at least 0.5% minimum therein. Other polymers useful in the present invention are known to those skilled in the art.

Insoluble particulates useful as additives in the dispersing medium of the present invention, for example, in the manufacture of pigmented composite structures, include latex particles, kaolin, alumina, glass microspheres, and other common fillers known to those skilled in the art. The weight percent of filler compared to the total dispersion can be from 0 to 80%, preferably 0 to 60%, and more preferably 0 to 50%. The high specific heat additives may assist in moderating the temperature of the dispersing medium.

The non-reactive gas can be virtually any gas that does not react with the metal or other material forming the nanoparticle under the conditions of the experiment. Typical choices are He, Ne, Ar, Xe, and $N_2$. Mixtures of two or more non-reactive gases can also be used. When modification of the metal particles is desired as is desired here, a reactive gas can be introduced through a gas inlet that is positioned so as to minimize reaction with the bulk material in the crucible and allow thorough mixing of the reactive gas with the particles entrained in the gas stream, thereby allowing reaction with the particles to occur. The reactive and non-reactive gases generally are at room temperature, but the temperature can be elevated or reduced as desired. The term reactive includes 1) direct reaction with the particles, as in the case of metals, for example, with $O_2$, NO, $NO_2$, $CO_2$, CO, $AsH_3$, $H_2S$, $H_2Se$, $NH_3$, trimethylchlorosilane, methylamine, ethylene oxide, water, HF, HCl, or $SO_2$, or combinations thereof, to form the corresponding oxides or other compounds; 2) wetting, as described in UK Patent 736,590 to increase dispersibility in which particles are exposed to the vapor of a volatile liquid which may be identical to the dispersing medium or may be miscible with the dispersing medium, prior to contacting the bulk dispersing medium so as to create a solid/liquid interface while the particles are suspended in the gas stream; and 3) adsorption, in which a volatile substance is introduced in the gas prior to contacting the dispersing medium, similar to wetting, but the substance is either not a liquid under normal conditions (atmospheric pressure and 25° C.), the substance is not miscible with the dispersing medium, or else the substance acts to protect the surface of the ultrafine metal particles from the dispersing medium or additives within the dispersing medium. Typical substances that could be adsorbed include polymers such as poly(methylmethacrylate) and polystyrene, and surface active agents.

Temperatures for evaporation of metals useful in the method of the present invention depend on the type of pigment being used and generally range from 25° C. to around 500° C. when organic pigments are used and from 25° C. to around 1200° C. or even 25° C. to 3000° C.

Temperatures of the dispersing medium useful in the method of the present invention depend on the particular medium being used and generally range from −78° C. to 400° C., preferably from −50° C. to 300° C., and most preferably from 0° C. to 200° C.

Pressures useful in the method of the present invention range from about 0.001 to 300 torr, preferably 0.01 to 200 torr, more preferably from 0.01 to 100 torr, and most preferably from 0.1 to 50 torr. The composition of the combination non-reactive and reactive gas stream can be from about 5 to 100% non-reactive gas or combination of non-reactive gases, preferably from 25 to 100%, more preferably from 50 to 100%. A reactive gas introduced through an additional inlet downstream from the evaporation source can be present as a component in the gas stream in a percent ranging from 0 to about 95%, preferably from 0 to 75%, and more preferably, 0 to 50%.

An apparatus for providing dispersions of ultrafine metal particles comprises:

a) a furnace connected to a collection vessel, the furnace containing a heating means (e.g., resistive, inductive, e-beam, infrared, laser, plasma jet) and adapted to contain at least a first and optionally a second gas inlet tube, said second tube being located downstream from said first tube, and a mechanical pump for evacuating the furnace and directing the gas phase carrying evaporated metal particle to the collection zone or vessel the zone and/or vessel containing a dispersing medium;

b) an optional system (e.g., a ceramic, plastic, or metal crucible or slab that can be preloaded with material or which can be continuously or batch-wise fed during operation of the apparatus, or the electrodes can be the means) for introducing a metal into the furnace and evacuation thereof;

c) optionally a system (e.g., a micro metering valve, electronic flow controller, or gas dispersing tube) for introducing through the first inlet tube a first, non-reactive gas stream into the furnace;

e) an evaporating or gas phase producing system (e.g., energy input as by e-beam, infrared, laser, inductive, resistive, or plasma jet) for evaporating of generating a gas phase of the metal particles into the first gas stream;

f) a collection/condensation medium between or coincident with the evaporating or gas phase producing system for allowing condensation of the vaporated metal particles (e.g., decreasing the temperature, raising the pressure, changing the chemical nature of the non-reactive gas, controlling the length of the transfer tube, controlling the gas flow rate, or combinations thereof) in the first gas stream to produce a dispersion of ultrafine metal particles in the first gas stream in a dispersing medium in the collection/condensation zone;

g) optionally, a system (e.g., tube, valve, pipe, a micro metering valve, electronic flow controller, or gas dispersing tube) for introducing into the furnace or after the furnace but before collection through the second inlet tube a second, reactive gas stream, to allow reaction with the metal particles, to provide ultrafine reacted metal particles;

h) a region within the system for collecting particles in the collection/condensation vessel (e.g., bubbling into or impinging particles onto the dispersing medium).

Reactive materials include compounds, compositions and materials that chemically react directly with the metal or which coat the metal particles and then may themselves be reacted, by themselves or with other materials or by specific activation. Examples of such reactive materials are materials in vapor form such as acids, oxidizing agents, reducing agents if the metal has been undesirably oxidized), polymerizable materials (e.g., monomers in vapor form), ambifinctional materials that can react with one end of a molecule to the metal and have another end of the molecule available for reaction with another material or surface.

The innovation described herein involves at least a repositioning of the vacuum pump in the system which a) allows a higher level of vacuum to be achieved, b) reduces the particle size of the metal particles formed and c) increase the efficiency of wet collection of the nanoparticles formed to as much as greater than 95%. This is a substantial improvement over the prior art where the wet collection of pigment particles occurred prior to the source of vacuum in the system. In prior art, the efficiency of the wet collection was a maximum of 50% at low gas flow rates (e.g., 2 liters/minute). This modest level of efficiency drops substantially at higher gas flow rates through the system. The present invention can use higher flow rates, higher than 3 liters/minute, higher than five liters/minute, higher than seven liters per minute, higher than 10 or 20 liters/minute and even higher than 50 liters per minute and provide collection efficiency rates of greater than 80%, greater than 90% in some cases, and still as high as 95% in some other cases.

With the presence of nanoparticles in the gas stream, oil sealed mechanical pumps do not function in this altered processing scheme. Dry, mechanical pumps that utilize gas-purged bearings are the most preferred for this application. These pumps can tolerate the presence of large amounts of particulate in the gas streams that are being pumped and convey the particulate from the inlet to the exhaust of the pump. Various models can also convey various liquids and vapors through their interiors. These pumps are in widespread usage in the semiconductor industry. For this application, scroll pumps did not provide sufficient performance without powder buildup in the interior of the pump. Dry lobe and screw pumps provided a sufficient amount of vacuum for the evaporation processes without powder buildup. Most preferred were dry screw pumps that could tolerate the presence of low volatility liquids (Isopar®, Dowanal®, Purasolv®, etc.) in the pump mechanism. These liquids could be injected into the inlet of the vacuum pump and used as scrubbing/condensation/collection media for the nanoparticles formed. The collection efficiency of this method is >95% of the nanoparticulate material entering the vacuum pump. Higher volatility liquids and viscous liquids as the collection/dispersion/scrubbing media (e.g., prepolymers, polymers, monomers) required the use of an alternate wet collection system, such as a venturi scrubber, positioned after the vacuum pump. These pumps typically operated at 1–10 Torr utilizing gas flows of up to 50 liters/min of an inert gas at 100° C.

The innovation described involved a repositioning of the vacuum pump in the system to a) allow a higher level of vacuum to be achieved, b) reduce the particle size of the metallic nanoparticles formed and c) increase the efficiency of wet collection of the nanoparticles formed to as much as greater than 95%. This is a substantial improvement over the prior art where the wet collection occurred prior to the source of vacuum in the system. In prior art, the efficiency of the wet collection was a maximum of 50% at low gas flow rates. This efficiency drops substantially at higher gas flow rates through the system.

With the presence of nanoparticles in the gas stream, oil sealed mechanical pumps do not function in this altered processing scheme. Dry, mechanical pumps which utilize gas-purged bearings are the most preferred for this application. These pumps can tolerate the presence of large amounts of particulate in the gas streams that are being pumped and convey the particulate from the inlet to the exhaust of the pump. Various models can also convey various liquids and vapors through their interiors. These pumps are in widespread usage in the semiconductor industry. For this application, scroll pumps did not provide sufficient performance without powder buildup in the interior of the pump. Dry lobe and screw pumps provided a sufficient amount of vacuum for the evaporation processes without powder buildup. Most preferred were dry screw pumps that could tolerate the presence of low volatility liquids (Isopar®, Dowanal®, Purasolv®, kerosene, diesel fuel, etc.) in the pump mechanism. These liquids could be injected into the inlet of the vacuum pump and used as scrubbing media for the nanoparticles formed. The collection efficiency of this method is as much as >95% of the nanoparticulate material entering the mechanical vacuum pump. Higher volatility liquids and viscous liquids (prepolymers, polymers, monomers) required the use of an alternate wet collection system, such as a venturi scrubber, positioned after the vacuum pump. These pumps typically operated at 1–10 Torr utilizing gas flows of up to 50 liters/min of an inert gas at 100° C.

A wire feed mechanism replenished the crucible after each metal charge had been evaporated and converted to nanoparticles by inert gas condensation. The dust-laden gas was then conveyed to and through the dry screw vacuum pump, where it was either scrubbed out by injection of low volatility solvents at the inlet of the pump (i.e., within a pump chamber and therefore coincident with entrance to the pump) or passed through the pump (and therefore after entering and passing through the pump) and scrubbed out by a wet collection unit behind it. The slurry formed could then be used in the intended final product or used for further treatment of the nanoparticles formed.

EXAMPLE 1

Aluminum Nanoparticle Collection in Isopar® G

The system as described above was used to evaporate aluminum wire and form nanoparticles from it. In this example, aluminum was used, but pigments (both organic and inorganic) have also been used, with merely adjustments in the evaporation temperature and the selection of the dispersant medium. Isopar® G was used as a collection fluid for the system and injected at rates of 0.25–0.5 liter/min into the inlet of the vacuum pump. Argon gas flow was maintained at a level of 20 l/min to yield a background pressure of ~8 Torr in the chamber. The nanoparticles formed were collected at 95% efficiency in the liquid slurry at a primary particle size of 0.03 microns. Reactive gas is introduced at any point prior to collection to enable reaction of the surface of the particle.

EXAMPLE 2

Copper Nanoparticle Collection in Purasolv® BL

The system as described above was used to form copper nanoparticles utilizing copper wire. In this example, copper was used, but pigments (both organic and inorganic) have also been used, with merely adjustments in the evaporation temperature and the selection of the dispersant medium. Purasolv® BL was used as the collection media at an injection rate of 0.25–0.5 l/min into the vacuum pump. Argon gas flow was maintained at a level of 10 Torr within the evaporation chamber. The nanoparticles formed were collected at >95% efficiency in the dry screw pump at a primary particle size of 0.01 microns. Reactive gas is introduced at any point prior to collection to enable reaction of the surface of the particle.

EXAMPLE 3

Collection of Aluminum Nanoparticles in HTPB/Heptane Solution

The system as described in FIG. 1 was used to evaporate aluminum wire, form aluminum nanoparticles and collect it into an Hydroxy Terminated Polybutadiene (HTPB)/heptane mixture. In this example, aluminum was used, but pigments (both organic and inorganic) have also been used, with merely adjustments in the evaporation temperature and the selection of the dispersant medium. The aluminum nanoparticles formed were conveyed through the dry screw pump and collected in a venturi scrubber operating behind the pump. The nanoparticles were collected into the resin/solvent slurry at an efficiency >90%. The primary particle size of the aluminum nanoparticles formed was 0.03 micron. The % of the HTPB in the heptane slurry was 10 wt %. With a ratio of 3 to 1 weight resin to aluminum nanoparticles, the mean agglomerate size in the resin was ~0.25 microns. The heptane could then be evaporated off of the resin to yield a useable nanoparticle-loaded HTPB slurry. Reactive gas is introduced at any point prior to collection to enable reaction of the surface of the particle.

As shown in FIG. 1, apparatus 10 for providing the present invention dispersions comprise furnace 12 having therein crucible 14 supported by electrodes 15 connected to an external power supply, not shown, and containing vaporizable material 16. Gas inlet tube 18 allows non-reactive gas 19 to be introduced into furnace 12 to envelop and assist in formation of fine particles 20 and facilitate their transportation through transfer tube 22 by way of the intermediate primary dry mechanical pump 23 to collection vessel 24. Collection vessel 24 contains liquid dispersing medium 26 into which transfer tube 22 having tube end 21 allows transported pigment particles 20 and non-reactive gas 19 to bubble into medium 26 (FIG. 1) or it allows transported pigment particles 20 and non-reactive gas 19 being transported through transfer tube 22 having tube end 21 to impinge upon medium 26. Transfer tube end 21 can be used in FIG. 1 apparatus. Condensor 32 is provided to return any evaporated liquid from liquid medium 26 back to collection vessel 24. Condensor 32 is connected to trap 38 and pump 40. Pump 40 is used to evacuate the entire apparatus 10 prior to and during use. Bypass valve 34 and bypass tube 36 allow for facile evacuation of furnace 12 prior to onset of pigment 16 evaporation. Valves 42 and 44 allow isolation of apparatus 10 from pump 40.

Other reactor designs to provide dispersions of the invention can be envisioned, including a rotary metal atom reactor such as described in Metal Vapour Synthesis in Organometallic Chemistry, J. R. Blackborow and D. Young, Springer-Verlag (N.Y.), 1979 and a spinning disk assembly such as described in Jpn. J. Appl. Phys., 13, 749 (1974), as long as the location of the mechanical pump is after the system for generating the gas phase of metal particles carried in the gas phase and between or coincident with the condensation/collection zone. Both types of reactors could be used to generate dispersions of metal particless. Additionally, metal that can be evaporated directly to generate discrete metal molecules may be used in these reactors to prepare dispersions of the present invention.

In addition to resistive heating, other means of applying heat to the pigment or pigment precursor may be envisioned. These include laser heating, inductive heating, plasma jet, plasma arc discharge, laser flashing, sputtering, and others known to those skilled in the art.

In a preferred embodiment the present invention provides metal nanoparticles, dispersions of metal nanoparticles, which metal nanoparticles are solid (i.e., solidified) dispersions of metal particles in a polymer, the particles having a mean average particle size of less than 0.1 micrometer (100 nanometers). In addition, the particles have a narrow size distribution and the dispersions are transparent, and are resistant to flocculation. The amount of pigment present in a coating is generally in the range of 0.001 to 50.0 weight percent, 0.001 to 30.0 wt percent, 0.001 to 10.0 wt percent, 0.001 to 5.0 wt percent, 0.001 to 3.0 wt percent, 0.001 to 1.0 wt percent, and more preferably 0.001 to 0.1 wt percent. Generally no surfactants or other dispersing aids are required when using the ultrafine particles of the present invention.

There are distinct advantages for using ultrafine particles as colorants in manufacturing processes and products. For medical devices or layers that provide critical physical or chemical properties, it is prudent to minimize the amount of metal particle required to achieve a specified level of a particular secondary property to preserve those properties; hence, a well dispersed nanoparticle of metal is desirable. Dispersions of ultrafine metal particles are more stable than their larger sized counterparts. This resistance to agglomeration prior to solidification of the liquid polymer makes the manufacturing of a articles less sensitive to uncontrollable environmental factors. Smaller particles form more stable dispersions/suspensions than do larger particles.

The dispersions of the present invention can be used to prepare articles by means of any type of article forming, such as casting, coating, toning, printing, molding, including injection molding and extrusion processes, casting, including spin casting, etc. Such articles include fibers and molded articles including conductive layers, structural elements, explosive materials, composites, electromagnetic responsive or resistive materials and the like. Coated dispersions of the present invention can be used to prepare high quality metallic graphic arts constructions such as sublimation type thermal transfer recording media, and any other applications where dispersed material is useful. The coating can be accomplished by any means known in the art including bar coating, knife coating, thermal mass transfer, curtain coating, meniscus coating, slot coating, etc. A wide variety of particle coating processes are known in the art. For larger size particles, e.g., for 1 mm or greater, the simplest, most cost effective process is direct immersion of particles in a coating composition (e.g., liquid, gel, powder, etc.) and removing the coated particles from the coating environment (with drying or agitation, as needed to fix the coating and separate the particles). Particles may be carried on a conveyor belt and sprayed or otherwise coated with coating compositions. Particles may be projected of dumped into a deposition coating environment (e.g., spray chamber, vacuum deposition chamber, electrostatic chamber, etc.) where the coating is applied. Mixtures of particles and coating compositions may be mixed, then sprayed to fix of dry the coating on the surface of particles.

As previously noted, many different types of reactive materials may be combined with the nanoparticles of the invention, and that combining of materials may be effected at various stages of the process. The selection of the time of addition may be varied dependent upon the reactivity of the reactive ingredient, its compatibility with the metal, the tubing, the condensing medium, and whether other ingredients or treatments are needed to cause the reactive ingredient to react with or treat the surface of the particle in the manner desired. Certain reactive materials may be present as the non-reactive carrying medium, if they are slow reacting or need another component or unique conditions (e.g., e-beam, ultraviolet radiation, infrared radiation, etc.) to react or treat the surface of the nanoparticles. Other reactive materials may be introduced within the carrying tube (e.g., 22) before the dry mechanical pump, in the dry mechanical pump (as a condensing medium 26 or as a component of the condensing medium), or in the condenser or before the secondary pump 40. Similarly, any essential treatment or reaction zone may be located where expeditious within the system, along with any essential subcomponents needed for the treatment or reaction. Such subcomponents could include any of electromagnetic radiation sources, ultraviolet radiation sources (lamps, lasers, etc.), infrared radiation sources, visible radiation sources, e-beam sources, heat sources, steam sources, reactive gas sources, catalyst solutions, initiator sources, and the like. The reaction or treatment may be performed while the particles are suspended in a fluid (gas or liquid) medium as in a suspension, dispersion, fluidized bed, etc., or while the particles are settled on a support. In the latter case, it is likely that such a process would be preferred only where the reaction is between the reactive ingredient and the particle surface, and not where the reactive medium reacts with itself to form a layer (as with monomers used to form a polymeric coating). Many variations of the process within the defined parameters of the invention are apparent to those skilled in the art, without further explanation, and those variants are intended to be included within the broad scope of the invention.

What is claimed:

1. A process of collecting reacted metal nanoparticles comprising forming a vapor of a metal that is solid at room temperature, the vapor of the metal being provided into an inert gaseous carrying medium, solidifying at least some of the metal within the gaseous carrying medium to form metal nanoparticles, combining the metal particles with a reactive gas medium, moving the metal nanoparticles in a gaseous carrying environment through a dry mechanical pumping system, and while the particles are within the dry mechanical pumping system or after the nanoparticles have moved through the dry pumping system, contacting the metal nanoparticles with an inert liquid collecting medium.

2. The process of claim 1 wherein the reactive gasesous medium material comprises a polymerizable monomer that can be polymerized to form a polymer coating on the surface of the particle.

3. The process of claim 2 wherein the inert liquid collecting medium comprises an organic liquid.

4. The process of claim 2 wherein metal particles within the dry mechanical pumping system are contacted with an inert liquid collecting medium.

5. The process of claim 2 wherein metal particles are contacted with an inert liquid collecting medium after leaving the dry mechanical pumping system.

6. The process of claim 5 wherein a vacuum system is installed to provide additional driving force to collect nanoparticles by physical filtration.

7. The process of claim 1 wherein the reactive gasesous medium comprises an ambifunctional compound with only a single chemical function that can react with the metal.

8. The process of claim 7 wherein the inert liquid collecting medium comprises an organic liquid.

9. The process of claim 7 wherein metal particles within the dry mechanical pumping system are contacted with an inert liquid collecting medium.

10. The process of claim 9 wherein the nanoparticles are also collected by physical filtration.

11. The process of claim 9 wherein the nanoparticles are collected in slurry and subsequently coated using high pressure reactor coating.

12. The process of claim 7 wherein metal particles are contacted with an inert liquid collecting medium after leaving the dry mechanical pumping system.

13. The process of claim 1 wherein the reactive gasesous medium chemically reacts directly with metal on the surface of the particle.

14. The process of claim 1 wherein the metal nanoparticles comprise a metal having a vaporization temperature between 200° C. and 3000° C.

15. The process of claim 1 wherein the metallic nanoparticles comprise at least one metal selected from the group consisting of Al, Cu, Ti, Ag, Au, Pb, Sn, Zr, and Ni.

* * * * *